(12) United States Patent
Bjorkengren

(10) Patent No.: US 10,649,061 B2
(45) Date of Patent: May 12, 2020

(54) METHOD AND SYSTEM FOR DETERMINING THE POSITION OF A USER DEVICE IN RELATION TO A VEHICLE

(71) Applicant: VOLVO CAR CORPORATION, Gothenburg (SE)

(72) Inventor: Ulf Bjorkengren, Bjarred (SE)

(73) Assignee: VOLVO CAR CORPORATION, Gothenburg (SE)

( * ) Notice: Subject to any disclaimer, the term of this patent is extended or adjusted under 35 U.S.C. 154(b) by 0 days.

(21) Appl. No.: 15/939,943

(22) Filed: Mar. 29, 2018

(65) Prior Publication Data

US 2018/0292506 A1 Oct. 11, 2018

(30) Foreign Application Priority Data

Apr. 6, 2017 (EP) ..................................... 17165165

(51) Int. Cl.
*G01S 3/808* (2006.01)
*G01S 5/02* (2010.01)
(Continued)

(52) U.S. Cl.
CPC .............. *G01S 3/8083* (2013.01); *G01S 3/02* (2013.01); *G01S 5/0273* (2013.01); *G01S 5/12* (2013.01);
(Continued)

(58) Field of Classification Search
CPC ........ G01S 17/026; G01S 7/484; G01S 19/13; G01S 2013/9375; G01S 2013/9385;
(Continued)

(56) References Cited

U.S. PATENT DOCUMENTS

2002/0196188 A1* 12/2002 Holt .......................... G01S 3/02
342/453
2005/0219950 A1* 10/2005 Rowe .................... G01S 5/0226
367/118
(Continued)

FOREIGN PATENT DOCUMENTS

WO 2010084308 A2 7/2010

OTHER PUBLICATIONS

Extended European Search Report for European Application No. 17165165.6, completed by the European Patent Office, dated Feb. 9, 2018, 11 Pages.

*Primary Examiner* — Jaime M Holliday
(74) *Attorney, Agent, or Firm* — Brooks Kushman P.C.

(57) ABSTRACT

A method is described for determining a position of a user device in relation to a vehicle, the vehicle including first and second receivers. The method includes transmitting a positioning signal by the transmitter of the user device, receiving the positioning signal by the first receiver and by the second receiver arranged at a distance from the first receiver, in at least one of the first and second receivers, receiving and identifying a reflected positioning signal reflected at a ground surface before reaching the first and second receivers, performing time synchronization between the transmitter and the first and second receiver, determining a position of the user device in a three-dimensional coordinate system based on a time-of-flight of the positioning signal received in the first and second receivers and on a time-of-flight of at least one reflected positioning signal received by at least one of the first and second receivers.

20 Claims, 6 Drawing Sheets

(51) Int. Cl.
*G01S 5/30* (2006.01)
*G07C 9/00* (2020.01)
*H04W 4/029* (2018.01)
*G01S 3/02* (2006.01)
*G01S 5/12* (2006.01)
*G01S 5/14* (2006.01)
*H04B 17/27* (2015.01)
*G01S 7/484* (2006.01)
*G01S 15/93* (2020.01)
*G01S 19/13* (2010.01)
*G01S 15/931* (2020.01)

(52) U.S. Cl.
CPC ............ *G01S 5/30* (2013.01); *G07C 9/00309* (2013.01); *H04W 4/029* (2018.02); *G01S 5/14* (2013.01); *G01S 7/484* (2013.01); *G01S 19/13* (2013.01); *G01S 2015/932* (2013.01); *G07C 2009/00261* (2013.01); *G07C 2009/00317* (2013.01); *G07C 2009/00769* (2013.01); *G07C 2009/00865* (2013.01); *G07C 2009/00984* (2013.01); *G07C 2209/63* (2013.01); *H04B 17/27* (2015.01)

(58) Field of Classification Search
CPC ..... G01S 2013/9389; G01S 2013/9392; G01S 2015/932; G01S 3/02; G01S 3/8083; G01S 5/0273; G01S 5/12; G01S 5/14; G01S 5/30
See application file for complete search history.

(56) References Cited

U.S. PATENT DOCUMENTS

| | | | |
|---|---|---|---|
| 2008/0212814 A1* | 9/2008 | Barthel | H04R 3/005 381/313 |
| 2010/0076622 A1 | 3/2010 | Dickerhoof et al. | |
| 2012/0044786 A1* | 2/2012 | Booij | G01S 5/18 367/127 |
| 2014/0274151 A1 | 9/2014 | Pattabiraman et al. | |
| 2016/0107611 A1* | 4/2016 | Siswick | H04L 67/125 340/425.5 |
| 2016/0205238 A1* | 7/2016 | Abramson | G01C 21/3484 455/456.4 |
| 2017/0361806 A1* | 12/2017 | Scheim | H04W 4/029 |
| 2018/0007507 A1* | 1/2018 | Ghabra | H04B 1/3822 |

* cited by examiner

METHOD AND SYSTEM FOR DETERMINING THE POSITION OF A USER DEVICE IN RELATION TO A VEHICLE

CROSS-REFERENCE TO RELATED APPLICATIONS

This application claims foreign priority benefits under 35 U.S.C. § 119(a)-(d) to European patent application number EP 17165165.6, filed Apr. 6, 2017, which is incorporated by reference in its entirety.

TECHNICAL FIELD

The present disclosure relates to a system and a method for determining the position of a user device in relation to a vehicle based on signals transmitted between the user device and the vehicle.

BACKGROUND

The ability to accurately position a driver outside of a vehicle in relation to the vehicle can support several uses. For example, when locking and unlocking the car it may be required that the driver must be within a certain range of the vehicle, thereby making it important with an accurate determination of the position of the driver.

Other actions which may require accurate positioning of a driver or a user device held by the driver may be starting the vehicle and opening the trunk lid. It may also be possible to move the car from a position outside of the vehicle by using movement of the user device to control movement of the vehicle.

One well known positioning method for electronic devices is to use a GPS device. However, for many applications, the accuracy of a GPS device may not be sufficient. Moreover, there are circumstances where a GPS device cannot be used due to a lack of reception, such as in a parking garage and in dense city environments.

Presently known general positioning solutions with higher accuracy typically build on either the Time-of-Arrival (TOA) principle, or the Time-Difference-of-Arrival (TDOA) principle. For a TOA-method, three receiver stations are required for obtaining a 3D position (x,y,z), and with two receiver stations it is only possible to obtain a 2D position (x,y). For a TDOA-method four receivers are required for determining a position in three dimensions.

Since each additional sensor required in the vehicle adds to the cost of the vehicle, it is desirable with improved solutions for determining a position of a user device in relation to a vehicle with reduced system requirements.

SUMMARY

In view of above-mentioned and other drawbacks of the prior art, it is an object of the present disclosure to provide an improved method and system of determining a position of a user device in relation to a vehicle.

According to a first embodiment of the disclosure, there is provided a method for determining a position of a user device in relation to a vehicle, the vehicle comprising a first and a second receiver. The method comprises transmitting a positioning signal by the transmitter comprised in the user device, receiving the positioning signal by the first receiver and by the second receiver being arranged at a distance from the first receiver; in at least one of the first and second receiver, receiving and identifying a reflected positioning signal having been reflected at a ground surface before reaching the receiver; performing time synchronization between the transmitter and the first and second receiver; determining a position of the user device in a three-dimensional coordinate system based on the time-of-flight of the positioning signal received in the first and second receiver and on the time-of-flight of at least one reflected positioning signal received by at least one of the first and second receiver.

According to the described method, a position of the user device can be determined with high accuracy in three dimensions using only two receivers in the vehicle, where information from reflected signals is used.

The described method requires time synchronization between the transmitter of the user device and the receivers. Even though the step of performing time synchronization is described as following the transmission and reception of the positioning signals in the above method, time synchronization may equally well be performed prior to transmitting the positioning signal from the user device. The main requirement of the time synchronization is that the user device and vehicle system can determine the time-of-flight of the positioning signal from the user device to the respective receiver of the vehicle, meaning that in practice the vehicle control unit should know the point in time when the positioning signal is transmitted from the user device, in a synchronized time system. Accordingly, the specific details of the time synchronization may vary while still allowing the above described method to be performed.

The present disclosure is based on the realization that in addition to the positioning signal received by two receivers, a reflection signal having been reflected in the ground plane can be used to determine the location of the user device in three dimensions, thereby reducing the requirement of three receiver for determining a location in three dimensions as is the case in a conventional time-of-arrival (TOA) location method. By reducing the number of receivers required in the vehicle, the cost and complexity of the locating system can be significantly reduced.

The reflected signal can in most cases be assumed to be the second signal reaching each of the receivers in the vehicle, after reception of the directly transmitted positioning signal. However, there may be situations when a reflected signal reaches the transmitter as the second signal but which has not been reflected in the ground plane. As an example, the signal may have been reflected in a wall or in another object. To further ensure that the second received signal is indeed a signal having been reflected in a ground plane, or to eliminate other signals, parking sensors of the vehicle may be used to determine if there are obstacles such as walls or other vehicles in the vicinity of the vehicle which may cause signals to reflect. The information acquired by the parking sensors can then be used to evaluate the probability of the second received signal having been reflected in the ground plane. If it is determined that there is high probability that the second received signal is not the desired ground reflected signal, the system can take note of this and include the uncertainty in the position determination. In many applications, the potential error in the determination of the position of the user device if the reflected signal is not a signal that has been reflected in a ground plane is not critical. For example, for locking and unlocking of the vehicle, opening a door or trunk or disabling an alarm, the determined position of the user device can most likely be considered to be sufficiently accurate even if the second signal received by the receiver is a signal that has been reflected in a wall, an adjacent vehicle or the like, as it for many applications is sufficient to know that the device is within a certain range.

According to one embodiment of the disclosure, the positioning signal may be an acoustic signal. The user device thereby comprises an acoustic transmitter and the vehicle comprises acoustic receivers. The acoustic signal may advantageously be an ultrasonic or near-ultrasonic signal having a frequency of about 20 kHz or above. By using an acoustic signal, in comparison to a radio signal, the receivers in the vehicle and the associated control logic can be simplified since the measured time-of-flight values are significantly larger for acoustic signals. Accordingly, the lower requirements of the timing circuitry for acoustic signals may also result in a lower cost of the system without significantly reducing the measurement accuracy. However, it should be noted that the described method equally well can be applied for a positioning signal which is a radio signal, given the appropriate receivers and control circuitry.

According to one embodiment of the disclosure, time synchronization may be performed by sending a time synchronization request signal from a transmitter in the vehicle, receiving the request signal in a receiver of the user device, and sending a time synchronization response signal from the user device to be received by at least one of the receivers in the vehicle. Once a positioning signal has been received by each of the first and second transmitter, time synchronization is required for accurately determining the three-dimensional location of the user device in relation to the vehicle. Thereby, a time synchronization request signal is sent by a transmitter of the vehicle and a corresponding time synchronization response signal is sent by the user device such that the user device and the two receivers in the vehicle form a time synchronized system. It is sufficient that one of the receivers in the vehicle receives the time synchronization response signal since it can be assumed that the two receivers in the vehicle are synchronized by means of a vehicle control unit. Moreover, as mentioned above, time synchronization may also have been performed prior to transmission of the positioning signal such that the overall system comprising the vehicle and the user device is already time synchronized when the positioning signal is transmitted by the user device, eliminating the need for additional time synchronization after reception of the positioning signal.

According to one embodiment of the disclosure the time synchronization request signal may be a radio signal. Moreover, the time synchronization response signal sent from the user device may be the same type of signal as a positioning signal, where the "same" signal means a signal having the same properties and characteristics as a positioning signal. Thereby, it is sufficient that the user device is configured to send only one type of signals, thereby facilitating the use of a simplified user device.

According to one embodiment of the disclosure, the method may comprise assuming that the latency in the user device is negligible in comparison to a time-of-flight of the response signal. The latency of the user device is here described as the time between receiving the time synchronization request signal in the user device to transmitting the time synchronization response signal by the user device. By assuming zero latency in the user device, meaning that the latency is sufficiently small to be neglected, the time difference between transmission of the time synchronization request signal and reception of the time synchronization response signal in the vehicle is only the travel time of the request and response signals. If at least one of the request and response signal is an acoustic signal, the travel time can be assumed to be significantly larger than any reasonable latency in the user device. If on the other hand both the request and response signals are radio signals, a latency in the user device may be a noticeable portion of the overall transmission time. Thereby, the user device may be configured such that the latency is minimized. It may also be possible that the latency of the user device is known to the vehicle control system and thereby taken into account when performing time synchronization. If the latency of the user device is previously unknown to the vehicle, the user device may be configured to transmit latency information to the vehicle such that the vehicle can take the latency of the user device into account when performing time synchronization.

According to one embodiment of the disclosure, the time synchronization may be performed using a Network Time Protocol, NTP, or a precision Time Protocol, PTP.

According to one embodiment of the disclosure, the method may further comprise: transmitting a second positioning signal from the user device; receiving the second positioning signal by the first receiver and by the second receiver; in at least one of the first and second receiver, receiving and identifying a reflected second positioning signal having been reflected at a ground surface before reaching the receiver; determining a second position of the user device; in the user device, determining a motion of the user device between transmission of the first positioning signal and transmission of the second positioning signal and transmitting information describing the motion to the vehicle; in the vehicle, determining a difference between a first position determined based on the first positioning signal and the second position determined based on the second positioning signal; and in the vehicle, comparing the determined difference in position with the received motion.

By determining a second position and by comparing the motion indicated by the difference between the two positions with an actual motion detected in the user device, the confidence of the positioning can be further increased. In particular, if the motion determined by the vehicle corresponds to the motion detected in the user device it can be established that the reflected signal used for determining the position is a signal having been reflected in a ground plane. Moreover, in a practical application it is likely that the receivers will receive several candidate signals where it cannot be immediately determined which one is the "correct" reflected signal. Thereby, the vehicle may calculate a plurality of both first and second positions, resulting in a plurality of determined motions to be compared with the measured motion of the user device.

Accordingly, the confidence of the determined location of the user device can be further improved by verifying that a motion of the user device, as detected or otherwise measured by the user device, is mirrored by the two separately determined positions. If it turns out that there is a mismatch between the measured motion and the difference in determined positions, further positioning signals can be transmitted until a position of the user device can be determined with sufficient confidence. The vehicle may then request that additional positioning signals are transmitted.

According to one embodiment of the disclosure, the position of the user device may be determined analytically based on the relations:

$$d_1 = \sqrt{(P_x + D_x)^2 + P_y^2 + P_z^2}$$

$$d_2 = \sqrt{(P_x - D_x)^2 + P_y^2 + P_z^2}$$

$$d_{r1} = \sqrt{(P_x + D_x)^2 + P_y^2 + (P_z + D_z)^2}$$

$$d_{r2}=\sqrt{(P_x-D_x)^2+P_y^2+(P_z+D_z)^2}$$

where $d_1$ is the distance from the first receiver position D1 to the user device P, $d_2$ is distance from the second receiver position D2 to the user device P, $P_x$, $P_y$, and $P_z$ are the coordinates of the user device P, $D_z$ is the z-coordinate of the receiver positions D1 and D2 assuming that both receivers are located at the same distance from the ground plane located in z=0, x=0 is located at an equal distance from D1 and D2 such that the x-coordinates of D1 and D2 are $-D_x$ and $D_x$, and $d_{r1}$ and $d_{r2}$ is the travel distance of the reflected signal between the user device P and the respective receiver positions D1 and D2.

Hereby, a method of determining the location of the user device in a three-dimensional coordinate system is described where the travel distances of both line-of-sight path and reflected path signals are used by means of the above equation system comprising four equations and three unknowns, Px, Py, Pz.

The above equations describe the relations where both of the receivers have received a reflected positioning signal. However, it is sufficient if only one of the receivers receive a reflected positioning signal. Accordingly, if both receivers have received a signal which is assumed to be a reflected positioning signal, either of the received reflected signals can be used to determine the location of the user device, so that the equation system shown above then consists of three equations instead of four.

According to a second embodiment of the disclosure, there is provided a system for determining a position of a user device in relation to a vehicle. The system comprises a user device comprising a transmitter and a receiver, wherein the user device is configured to transmit a positioning signal. The system further comprises a first receiver, a second receiver and a control unit in a vehicle, the first and second receiver being configured to receive the positioning signal transmitted by the user device and to receive and identify a reflected positioning signal having been reflected at a ground surface before reaching the receiver. The control unit is configured to initiate and perform time synchronization between the user device and the first and second receiver and to determine a position of the user device in a three-dimensional coordinate system based on the time-of-flight of the positioning signal received in the first and second receiver and on the time-of-flight of at least one reflected positioning signal received by at least one of the first and second receiver. The described system thereby form a time-synchronized system comprising the two receivers and the transmitter of the vehicle, and the user device, which is capable of determining a three-dimensional location of the user device based on travel times and known propagation velocities of the described signals. However, using established time synchronization protocol such as NTP or PTP, the vehicle and the device can, respectively, synchronize with the time servers of these protocols, possibly using other transmitters and receivers as the ones mentioned in this context.

According to one embodiment of the disclosure, the vehicle may advantageously comprise one receiver arranged in each corner of the vehicle, wherein each receiver has a horizontal directional sensitivity of at least 270°. Thereby, any location of a user device around the car is covered by at least two receivers, thereby ensuring that the location of the user device can be determined with the minimum amount of receivers in the vehicle according to the above described method. Accordingly, the directional sensitivity of the receivers along with the range of the transmitter of the user device sets the boundaries for detectable locations of the user device.

According to one embodiment of the disclosure, each receiver of the vehicle may advantageously have a vertical directional sensitivity of at least 180°. Thereby, the receivers can accurately receive the positioning signal for any elevation of the user device.

According to one embodiment of the disclosure the user device may advantageously comprise an acoustic transmitter and a radio receiver. The acoustic transmitter would then be used for providing the positioning signal and the radio receiver would receive the time synchronization request signals from the vehicle. The acoustic transmitter may advantageously be an ultrasonic transmitter.

According to one embodiment of the disclosure the user device may be a car key, a key fob, a smartphone. Accordingly, the above described functionality of the user device may be integrated in a car-key or a key-fob. The user device may also be a smartphone or a similar device which often is already equipped with the required transmitter and receiver. A smartphone may for example be capable of transmitting sound in the near-ultrasound range of 18-20 kHz, thereby making it possible to use a generic smartphone instead of providing a specific user device. It is also possible to provide a dedicated user device comprising only the described transmitter and receiver.

According to one embodiment of the disclosure the vehicle may comprise a radio transmitter for transmitting a time synchronization signal to the user device. Such a radio transmitter may be a general purpose transmitter or a specific transmitter being part of the positioning system.

Additional effects and features of the second embodiment of the disclosure are largely analogous to those described above in connection with the first embodiment of the disclosure.

Further features of, and advantages with, the present disclosure will become apparent when studying the appended claims and the following description. The skilled person realize that different features of the present disclosure may be combined to create embodiments other than those described in the following, without departing from the scope of the present disclosure.

BRIEF DESCRIPTION OF THE DRAWINGS

The present disclosure will now be described in more detail, with reference to the appended drawings showing an example embodiment of the disclosure, wherein.

DETAILED DESCRIPTION

As required, detailed embodiments are disclosed herein. However, it is to be understood that the disclosed embodiments are merely exemplary and that various alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
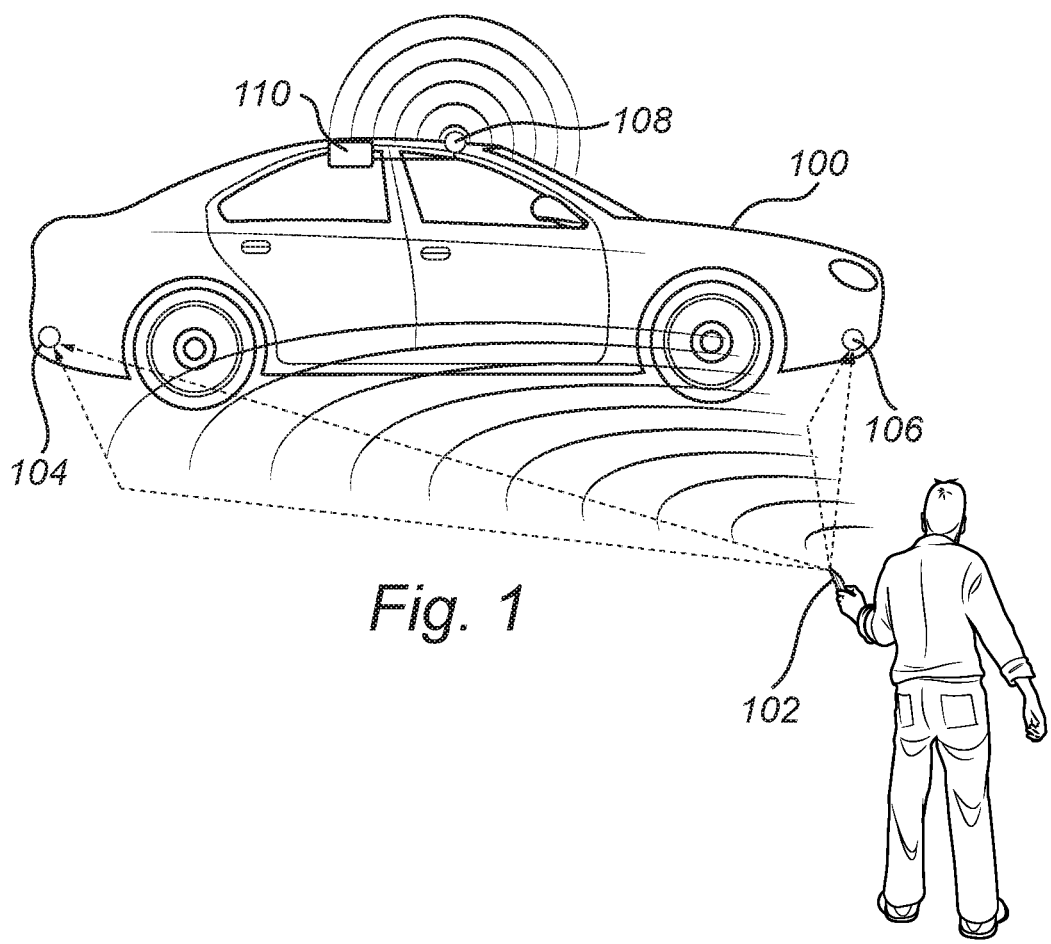
FIG. 1 schematically illustrates a vehicle comprising a system according to an embodiment of the present disclosure.

Various embodiments of the disclosure will be described with reference to FIG. 1 schematically illustrating a vehicle 100 and a user device 102, and to the flow chart of FIG. 2 outlining the general steps of a method according to an embodiment of the disclosure.

FIG. 1 illustrates a vehicle 100 comprising a system for determining a position of a user device 102 in relation to the vehicle 100. The user device 102 comprises a transmitter and a receiver (not shown). The user device 102 is here illustrated by a smartphone. However, the user device 102 may equally well be a vehicle key, a key fob, or any other device comprising the required transmitter and receiver.

Figure 2:
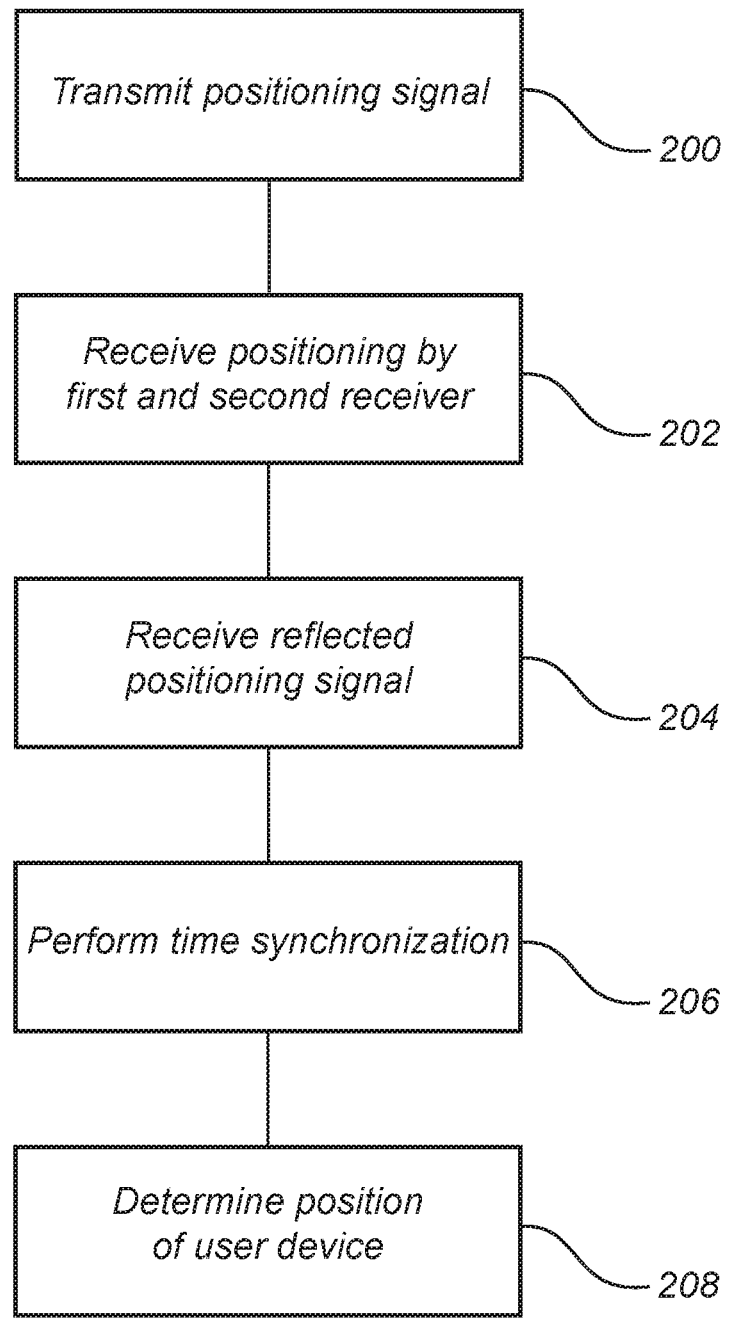
FIG. 2 is a flow chart outlining the general steps of a method according to an embodiment of the disclosure.

With reference to FIG. 2, the first step in determining a position of the user device 102 is to transmit 200 a positioning signal from the user device 102. The positioning signal can be either an acoustic signal or a radio signal, such as a BLE-signal (Bluetooth low energy). An acoustic signal may be an ultrasonic signal. When the user device is a smartphone, the signal may be a near-ultrasonic signal having a frequency in the range of 18-20 kHZ, since a speaker of a smartphone may be able to emit sound within the given frequency range without modifications. The smartphone may for example comprise an application for controlling the transmitter. The user device 102 may also be a device comprising an ultrasonic transmitter for transmitting a signal having a frequency in the range of 40-50 kHZ.

The vehicle 100 is equipped with a first receiver 104, a second receiver 106, a transmitter 108 and a control unit 110 for controlling the receivers 104, 106 and the transmitter 108. For an acoustic positioning signal, a substantially clear line of sight is required between the user device 102 and the receivers 104,106 of the vehicle 100.

The control unit 110 may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device and/or for performing the functions and/or operations described herein.

Moreover, the control unit 110 may be a general purpose control unit of the vehicle, or it may be a dedicated control unit specifically configured to control the location determination system.

The first and second receivers 104, 106 are located at a distance from each other. In particular, in the illustration in FIG. 1, the receivers 102, 104 are located in respective corners of the vehicle 100 to maximize the area coverage of the receivers 104, 106. However, it should be noted that in principle any placement of the receivers is possible as long as two receivers are capable of receiving the positioning signal and as long as there is sufficient separation between the two receivers to distinguish two different paths travelled by the positioning signal. A vehicle 100 may for example be equipped with two receivers on each side of the vehicle, to a total of eight receivers. It is also possible to utilize receivers in the vehicle which are also used for other purposes. Even though the distance between the receivers in theory can be arbitrarily small, it is desirable to maximize the distance between the receivers, while still being within the outer boundaries of the vehicle.

When the positioning signal has been transmitted 200 by the user device 102, it is received 202 by the two receivers 104, 106 in the vehicle 100, and at least one of the receivers 104, 106 also receives 204 and identifies a reflected positioning signal having been reflected at a ground surface before reaching the receiver. For each receiver 104, 106, the reflected positioning signal can as a first approximation be assumed to be the second received signal, i.e. the signal received directly after the directly transmitted positioning signal has been received.

Next, time synchronization is performed 206. When the receivers 104, 106 and the associated control unit 110 are synchronized with the user device 102, and the point in time of the transmission of the positioning signal by the device can be determined by the vehicle, a position of the user device 102 can be determined 208 in a three-dimensional coordinate system based on the time-of-flight of the positioning signal and on the time-of-flight of the at least one received reflected positioning signal. The positioning signal may be configured in many different ways, one non-limiting example being a chirp-signal which also may be modulated to carry information.

In the time synchronized system comprising at least the user device 102, the first and second receiver 104, 106 and the vehicle control unit 110, it can be assumed that the control unit 110 knows the signal type and propagation velocity for all of the transmitted signals, i.e. the positioning signal as well as the time synchronization request and response signals. Through the time synchronization, the travel distance of the direct path signal and of the reflected path signal can be determined since the propagation velocity of the signals is known.

However, since the propagation velocity of the positioning signal may be temperature dependent, in particular when using an acoustic signal, the control unit may advantageously be connected to an outdoor temperature sensor of the vehicle in order to calibrate the propagation velocity of acoustic signals.

An embodiment of the method of determining the position of the user device 102 in relation to the vehicle 100 is described in the following:

1. The vehicle 100 and the user device 102 establish a wireless connection, possibly including mutual authentication and setup of a secure communication channel.

2. The vehicle 100 and the user device 102 share a message ID to be encoded into the positioning signals. Sharing a message ID typically involves generating a random number to be used during one session, possibly with a one-way transformation for each message sent, or a set of random numbers to be used in consecutive positioning signals.

3. The user device 102 transmits 200 a positioning signal. The transmission of a positioning signal could be triggered by the user device 102 itself, by a request from the vehicle 104, or by an input from an operator of the user device 102.

4. The vehicle 100 receives 202 the positioning signal having propagated along a line-of-sight path to reach the first and second receivers 104, 106 at the positions D1 and D2, respectively.

5. The vehicle 100 receives 204 a reflected positioning signal propagated along a ground reflection path in least one of the first and second receiver 104, 106 at the positions D1 and D2, respectively.

6. The vehicle 100 and user device 102 synchronizes 206 their time references, unless time synchronization is already performed.

7. The user device 102 transmits information about the point in time that the positioning signal was transmitted to the vehicle. In the case of time synchronization initiated by the vehicle sending a time synchronization request, and the time synchronization response consists of the positioning signal as described in step 3 above, then the vehicle can derive the needed time synchronization itself, and this step can be omitted.

8. The control unit 110 of the vehicle 100 calculates the distances of the line-of-sight paths, and at least one of the ground reflected paths from the measured time-of-flight data.

9. The control unit 110 of the vehicle 100 determines 208 the three dimensional position of the user device 102 using the equation set as will described in the following.

Figure 3:
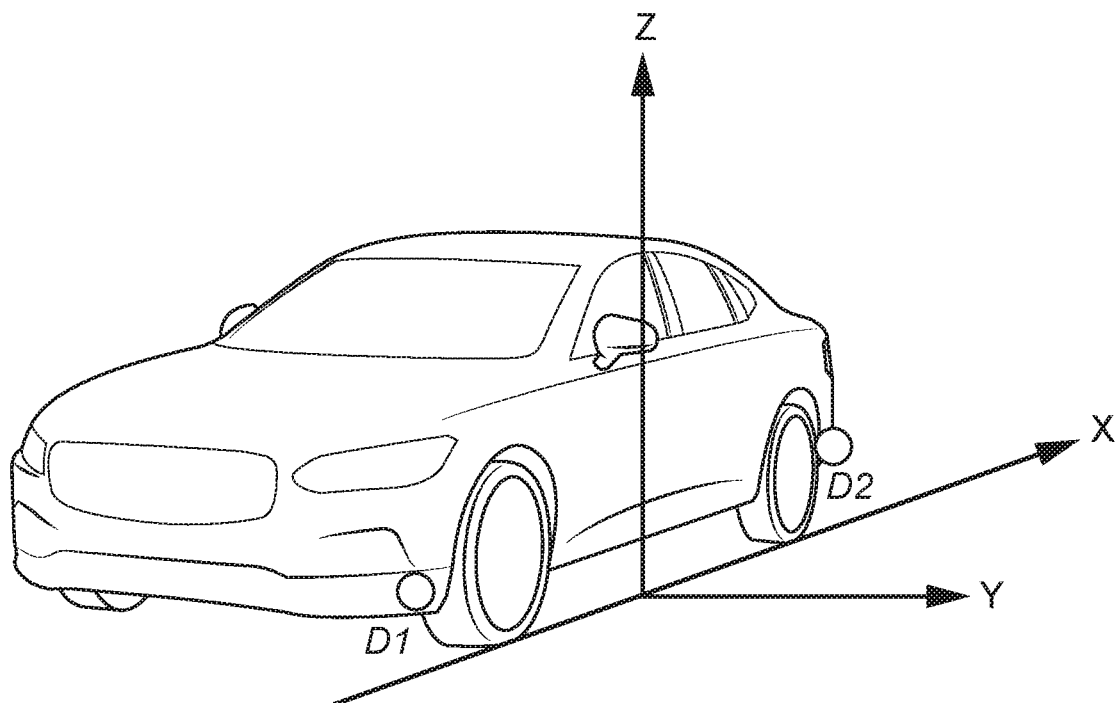
FIG. 3 schematically illustrates a coordinate system used in an embodiment of the disclosure.

FIG. 3 schematically illustrates an example coordinate system for determining the position of the user device 102. The skilled person readily realizes that the coordinate system may be shifted, translated and changed in any number of ways, and that the coordinated system in principle can be arbitrarily selected. The illustrated coordinate system has been selected to simplify the description of the method for determining the location of the user device 102 in relation to the vehicle 100. Moreover, even though the present description is focused on a stationary vehicle 100 and a mobile user device 102, it is equally possibly to apply the described method if the vehicle 100 is moving and the user device 102 is stationary, in which case the velocity of the vehicle may have to be taken into account.

In FIG. 3, the position D1 of the first receiver 102 and the position D2 of the second receiver 104 are located at y=0 and z=Dz, where Dz is known by the system. Moreover, the coordinate system is defined so that D1$x$=−D2$x$, herein referred to as ±Dx. In other words, the origin of the coordinate system is located at an equal distance from the positions D1 and D2 of the receivers 102, 104.

Figure 4:
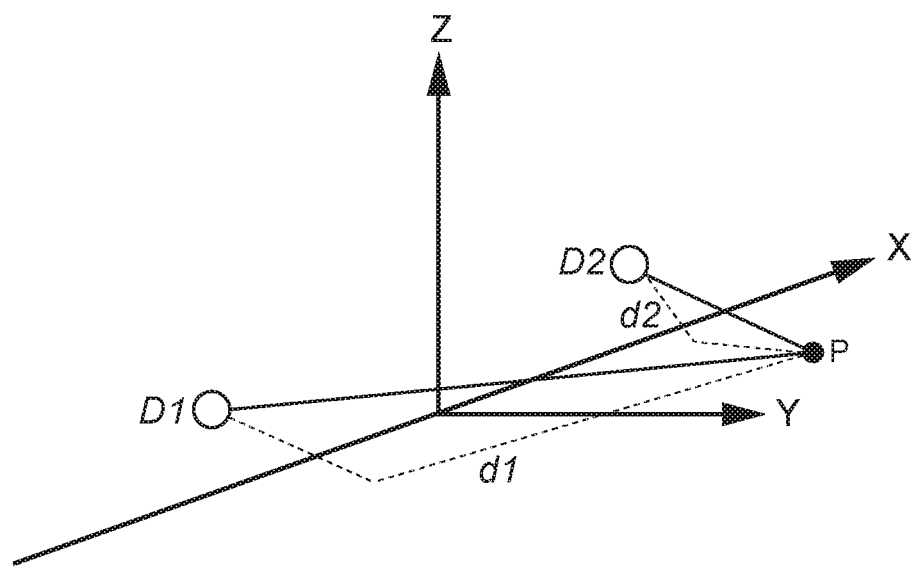
FIG. 4 schematically illustrates a coordinate system used in an embodiment of the disclosure.

FIG. 4 illustrates the position P of the user device 102. Here, the direct distance between the user device P and the first receiver 102, i.e. from P to D1, is defined as d1 and the distance between the user device P and the second receiver 104, i.e. f is defined as d2. The distances d1 and d2 can be determined as $d\_1=\sqrt{((P\_x+D\_x)^2+P\_y^2+P\_z^2)}$ and $d\_2=\sqrt{((P\_x-D\_x)^2+P\_y^2+P\_z^2)}$ with Px, Py and Pz unknown. Accordingly, a third equation is required for determining the position P.

Figure 5A:
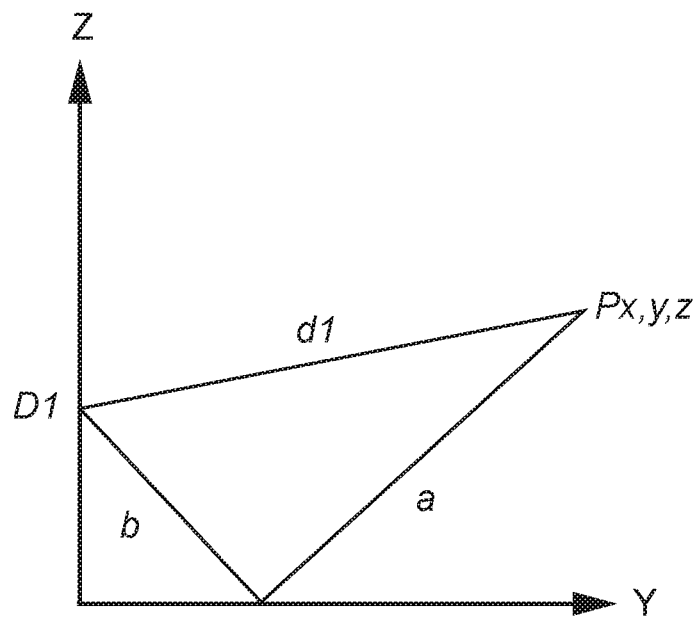
FIGS. 5A and 5B schematically illustrates a coordinate system used in an embodiment of the disclosure.
Figure 5B:
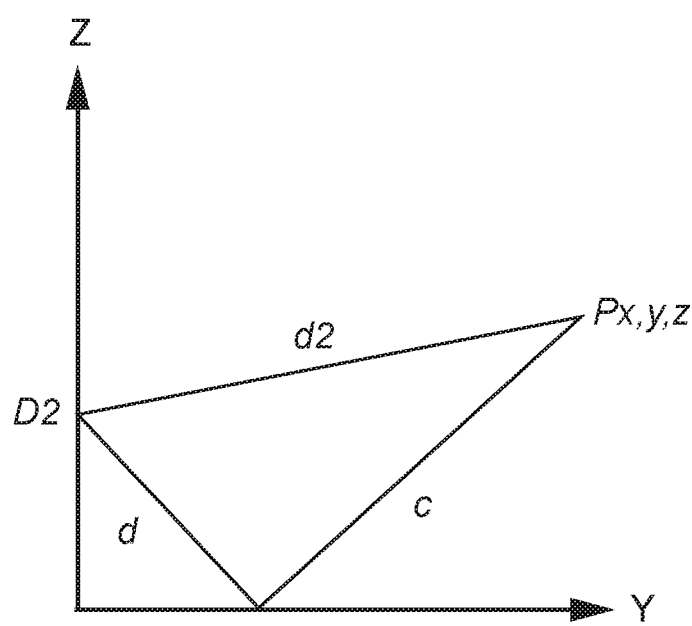

The third equation can be defined using the reflected signals illustrated in FIGS. 5A and 5B. The reflected signal reaching the first receiver 104 has a travel distance of a+b as illustrated in FIG. 5A, here denoted as dr1 and the reflected signal reaching the second receiver 106 has a travel distance of c+d as illustrated in FIG. 5B, here denoted as dr2. In short, dr1=a+b and dr2=c+d. Accordingly, the travel distance of the reflected signals can be described using the following relations:

$$d\_r1=\sqrt{((P\_x+D\_x)^2+(P\_y^2+(P\_z+D\_z)^2)}, \text{ and}$$

$$d\_r2=\sqrt{((P\_x-D\_x)^2+P\_y^2+(P\_z+D\_z)^2)}.$$

Thereby, either of the two received reflected signals can be used to form an equation system comprising three equations and three unknowns.

The above described equation can be solved analytically, numerically or iteratively to determine Px, Py and Pz, thereby determining the position of the user device. The accuracy of the determined position P depends on e.g. the accuracy of the determined travel times for the signals and on the accuracy of the receiver positions D1 and D2.

Figure 6:
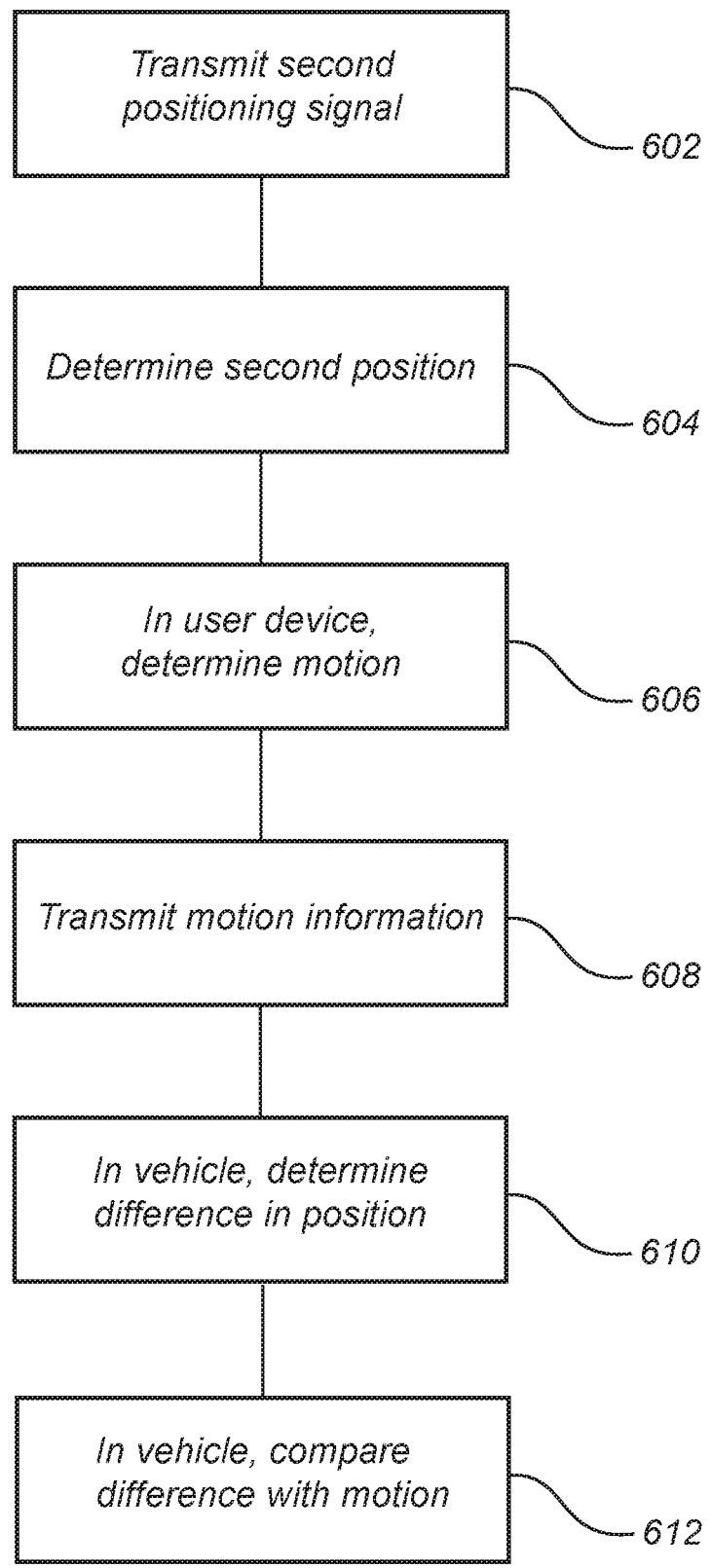
FIG. 6 is a flow chart outlining method steps according to a further embodiment of the disclosure.

FIG. 6 is a flow chart outlining method steps according to a further embodiment of the disclosure. The above described method may further comprise transmitting 602 a second positioning signal from the user device 102 and determining 604 a second position P2 of the user device 102 in the vehicle 100. The user device 102 further comprises a motion sensor for determining 606 a motion of the user device 102 between transmission of the first positioning signal and transmission of the second positioning signal. The user device 102 then transmits 608 information describing the motion of the user device 102 to the vehicle 100. The motion may for example be described as a trace by a series of coordinates, or simplified as a straight line between the starting point and end point of the motion. The motion of the user device 102 may for example be determined using an accelerometer of the user device 102 and dead reckoning, or by using a GPS unit in the user device 102.

In the vehicle 100, a difference between the determined position P based on the first positioning signal and the determined position P2 based on the second positioning signal is determined 610, and the determined difference in position is compared 612 with the received motion. If the determined difference corresponds to the measured motion, it can be assumed with higher confidence that the determined positions are correct, meaning that the received reflected signal was a signal reflected in a ground plane. However, if there is a difference in the comparison, further positioning signals may be required to increase the confidence of the determined position. Additional positioning signals from the user device 102 may then be requested by the vehicle control unit 110.

Moreover, the operator of the user device 102 may be prompted to move the user device 102 prior to transmission of a second position signal. As a further example, the user device 102 may be configured such that a second positioning signal is not transmitted until a certain amount of motion is detected. The predetermined amount of motion may then trigger transmission of a second positioning signal.

It is also possible the first and second receivers 104, 106 receive a number of different signals which could potentially contain a signal reflected in a ground plane. In the case where a plurality of potential candidates for ground plane reflected signals are received for either one or both of the first and second positioning signals, the control unit can determine a number of possible user device locations for each of the first and second positioning signal transmitted by the user device 102. This in turn gives a number of possible position differences to be compared with the received motion information from the user device 102. By selecting the position difference which best corresponds to the motion information, an increased confidence in the position determination can be achieved.

Accordingly, a number of received reflected signals for the first positioning signal result in a corresponding number of determined first user device positions: P11, P12, . . . P1N, and the same is true for the second positioning signal resulting in a corresponding number of second user device positions: P21, P22, . . . P2M, where N and M defines the number of received reflected signals resulting from the first and second positioning signal, respectively. Thereby, a number of motions of the user device can be determined in the vehicle as P11-P21, P11-P22, . . . P1N-P2M.

Furthermore, by combining the above described method comprising a plurality of positioning signals with information from parking sensors and the like, there is a good probability that the position of the user device 102 in relation to the vehicle 100 can be determined with a high degree of accuracy and confidence.

The described system and method for determining a position of a user device 102 may also be used to provide a solution to the physical layer relay attack problem. In particular, by using determined position data to estimate motion of the user device 102 e.g. smart phone, and then comparing this with the motion measured by the user device 102 by data from its motion sensors, it would become necessary for potential attackers to also synchronize the motion of the "fake" user device in proximity of the car with the motion of the remote "original" user device. This should make the attack process significantly more complex, and difficult to carry out in an unobtrusive way.

To prevent a physical layer relay attack, a method of providing secure authorizing for a user device 102 to be used with a vehicle 100 may comprise the following steps:
  detecting that a user device 102 is within a communication range of a vehicle 100
  establishing a communication channel between the vehicle 100 and the user device 102
  by the user device 102, transmitting a first and a second positioning signal to the vehicle 100
  in the user device 102, measuring a motion of the user device 102 between transmission of the first positioning signal and transmission of the second positioning signal and transmitting information describing measured motion to the vehicle 100
  in the vehicle 100, determining a first position and a second position of the user device 102 based on the received first and second positioning signals as described above, and estimating a motion of the user device 102 between the determined first position and the second position
  in the vehicle 100, comparing the in-vehicle estimated motion with the received measured user device motion information; and
  if the estimated motion information matches the measured user device motion information, authorizing the user device 102.

Figure 7:
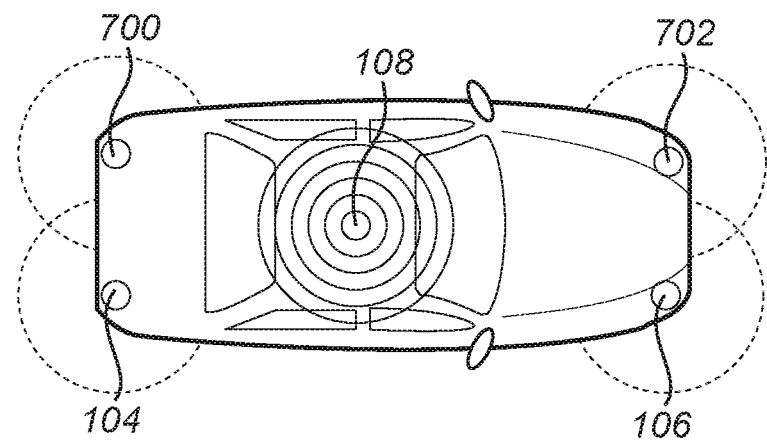
FIG. 7 schematically illustrates a vehicle comprising a system according to an embodiment of the present disclosure.

FIG. 7 schematically illustrates a vehicle comprising receivers 104, 106, 700, 702 arranged at or near all four corners of the vehicle, and where each receiver has a horizontal directional sensitivity of at least 270°.

FIG. 7 further illustrates that the vehicle transmitter advantageously may be an omnidirectional transmitter in the horizontal plane, such as a vertical antenna.

Figure 8:
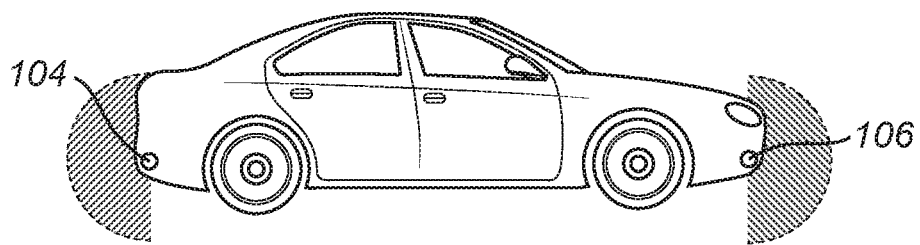
FIG. 8 schematically illustrates a vehicle comprising a system according to an embodiment of the present disclosure.

Moreover FIG. 8 schematically illustrates that each receiver of the vehicle has a vertical directional sensitivity of at least 180°.

Even though the disclosure has been described with reference to specific exemplifying embodiments thereof, many different alterations, modifications and the like will become apparent for those skilled in the art. Also, it should be noted that parts of the method and system may be omitted, interchanged or arranged in various ways, the method and system yet being able to perform the functionality of the present disclosure.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method for determining a position of a user device in relation to a vehicle, the vehicle comprising a first receiver and a second receiver and the user device comprising a transmitter, the method comprising:
  transmitting a positioning signal by the transmitter of the user device;
  receiving the positioning signal by the first receiver and by the second receiver, the second receiver arranged at a distance from the first receiver;
  in at least one of the first and second receivers, receiving and identifying at least one reflected positioning signal having been reflected before reaching the first and second receivers, wherein information acquired by parking sensors of the vehicle is used to evaluate a probability that the reflected positioning signal has been reflected at a ground surface;
  performing time synchronization between the transmitter and the first and second receivers; and
  determining a position of the user device in a three-dimensional coordinate system based on a time-of-flight of the positioning signal received in the first and second receivers and on a time-of-flight of the at least one reflected positioning signal received by at least one of the first and second receivers, wherein an uncertainty is included in the determined position in response to a probability that the at least one reflected positioning signal has been reflected at a non-ground surface exceeds a threshold value.

2. The method according to claim 1 wherein the positioning signal is an acoustic signal.

3. The method according to claim 2 wherein time synchronization is performed by sending a time synchronization request signal from a transmitter in the vehicle, receiving the request signal in a receiver of the user device, and transmitting a time synchronization response signal from the user device to be received by at least one of the receivers in the vehicle.

4. The method according to claim 3 wherein the time synchronization request signal is a radio signal.

5. The method according to claim 4 wherein the time synchronization response signal sent from the user device is the same type of signal as a positioning signal.

6. The method according to claim 3 further comprising assuming that a latency in the user device is negligible in comparison to a time-of-flight of the response signal.

7. The method according to claim 1 wherein the positioning signal is a radio signal.

8. The method according to claim 1 wherein the time synchronization is performed using a Network Time Protocol, NTP, or a precision Time Protocol, PTP.

9. The method according to claim 1 further comprising:
  transmitting a second positioning signal from the user device;
  receiving the second positioning signal by the first receiver and by the second receiver;

in at least one of the first and second receiver, receiving and identifying a reflected second positioning signal having been reflected at a ground surface before reaching the receiver;

determining a second position of the user device;

in the user device, determining a motion of the user device between transmission of the first positioning signal and transmission of the second positioning signal and transmitting information describing the motion to the vehicle;

in the vehicle, determining a difference between a first position determined based on the first positioning signal and the second position determined based on the second positioning signal; and in the vehicle, comparing the determined difference in position with the received motion.

10. The method according to claim 1 wherein the position of the user device is determined analytically based on the relations:

$$d\_1 = \sqrt{((P\_x+D\_x)^2+P\_y^2+P\_z^2)}$$

$$d\_2 = \sqrt{((P\_x-D\_x)^2+P\_y^2+P\_z^2)}$$

$$d\_r1 = \sqrt{((P\_x+D\_x)^2+P\_y^2+(P\_z+D\_z)^2)}$$

$$d\_r2 = \sqrt{((P\_x-D\_x)^2+P\_y^2+(P\_z+D\_z)^2)}$$

where d1 is the distance from a first receiver position D1 to the user device P, d2 is distance from a second receiver position D2 to the user device P, Px, Py and Pz are the coordinates of the user device P, Dz is the z-coordinate of the receiver positions D1 and D2 assuming that both receivers are located at the same distance from the ground plane which is located in z=0, and where x=0 is located at an equal distance from D1 and D2 such that the x-coordinates of D1 and D2 are -Dx and Dx, and dr1 and dr2 is the travel distance of the reflected signal between the user device P and the respective receiver positions D1 and D2.

11. A system for determining a position of a user device in relation to a vehicle, the system comprising;

a user device comprising a transmitter and a receiver, the user device being configured to transmit a positioning signal;

a first receiver, a second receiver, and a control unit adapted to be mounted in a vehicle, the first and second receivers configured to receive the positioning signal transmitted by the user device and to receive and identify at least one reflected positioning signal having been reflected before reaching the first and second receivers, wherein information acquired by parking sensors of the vehicle is used to evaluate a probability that the reflected positioning signal has been reflected at a ground surface, the control unit being configured to initiate and perform time synchronization between the user device and the first and second receivers and to determine a position of the user device in a three-dimensional coordinate system based on a time-of-flight of the positioning signal received in the first and second receivers and on a time-of-flight of the at least one reflected positioning signal received by at least one of the first and second receivers, wherein an uncertainty is included in the determined position in response to a probability that the at least one reflected positioning signal has been reflected at a non-ground surface exceeds a threshold value.

12. The system according to claim 11 wherein the vehicle comprises one receiver arranged in each corner of the vehicle, and wherein each receiver has a horizontal directional sensitivity of at least 270° and a vertical directional sensitivity of at least 180°.

13. The system according to claim 11 wherein the user device comprises an acoustic transmitter and a radio receiver.

14. The system according to claim 11 wherein the user device is a car key, a key fob or a smartphone.

15. The system according to claim 11 wherein the vehicle comprises a radio transmitter for transmitting a time synchronization signal to the user device.

16. A system for determining a position of a user device in relation to a vehicle, the user device comprising a transmitter and a receiver and being configured to transmit a positioning signal, the system comprising:

a first receiver adapted to be mounted in a vehicle;
a second receiver adapted to be mounted in a vehicle; and
a control unit adapted to be mounted in a vehicle;
wherein the first and second receivers are configured to receive the positioning signal transmitted by the user device and to receive and identify a reflected positioning signal having been reflected before reaching the first and second receivers, wherein information acquired by parking sensors of the vehicle is used to evaluate a probability that the reflected positioning signal has been reflected at a ground surface, the control unit being configured to initiate and perform time synchronization between the user device and the first and second receivers and to determine a position of the user device in a three-dimensional coordinate system based on a time-of-flight of the positioning signal received in the first and second receivers and on a time-of-flight of the reflected positioning signal received by at least one of the first and second receivers, wherein an uncertainty is included in the determined position in response to a probability that the at least one reflected positioning signal has been reflected at a non-ground surface exceeds a threshold value.

17. The system according to claim 16 wherein the vehicle comprises one receiver arranged in each corner of the vehicle, and wherein each receiver has a horizontal directional sensitivity of at least 270° and a vertical directional sensitivity of at least 180°.

18. The system according to claim 16 wherein the user device comprises an acoustic transmitter and a radio receiver.

19. The system according to claim 16 wherein the user device is a car key, a key fob or a smartphone.

20. The system according to claim 16 wherein the vehicle comprises a radio transmitter for transmitting a time synchronization signal to the user device.

* * * * *